US008661119B1

(12) United States Patent
Jindal et al.

(10) Patent No.: US 8,661,119 B1
(45) Date of Patent: *Feb. 25, 2014

(54) DETERMINING A NUMBER OF USERS BEHIND A SET OF ONE OR MORE INTERNET PROTOCOL (IP) ADDRESSES

(75) Inventors: Deepak Jindal, San Francisco, CA (US); Rama Ranganath, San Francisco, CA (US); Gokul Rajaram, Los Altos, CA (US); Fong Shen, San Jose, CA (US)

(73) Assignee: Google Inc., Mountain View, CA (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/836,509

(22) Filed: Jul. 14, 2010

Related U.S. Application Data

(63) Continuation of application No. 11/479,154, filed on Jun. 30, 2006, now Pat. No. 7,761,558.

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 5,905,248 A * | 5/1999 | Russell et al. | ............ | 235/462.15 |
| 6,085,224 A * | 7/2000 | Wagner | .......................... | 709/203 |
| 6,366,947 B1 * | 4/2002 | Kavner | .......................... | 709/203 |
| 6,792,458 B1 * | 9/2004 | Muret et al. | ................... | 709/224 |
| 6,973,625 B1 * | 12/2005 | Lupo et al. | .................... | 715/762 |
| 7,200,141 B2 * | 4/2007 | Chatterjee | ...................... | 370/352 |
| 7,293,101 B1 * | 11/2007 | Schaefer et al. | .............. | 709/232 |
| 7,373,524 B2 * | 5/2008 | Motsinger et al. | ............. | 713/194 |
| 7,437,364 B1 * | 10/2008 | Fredricksen et al. | ................. | 1/1 |
| 7,461,120 B1 * | 12/2008 | Artz et al. | ...................... | 709/203 |
| 7,474,617 B2 * | 1/2009 | Molen et al. | ................... | 370/232 |
| 7,523,016 B1 * | 4/2009 | Surdulescu et al. | .......... | 702/185 |
| 7,523,191 B1 * | 4/2009 | Thomas et al. | ............... | 709/224 |
| 7,624,173 B2 * | 11/2009 | Bary et al. | ..................... | 709/224 |
| 7,739,266 B2 * | 6/2010 | Riise et al. | ..................... | 707/716 |
| 7,746,774 B2 * | 6/2010 | Xue et al. | ...................... | 370/230 |
| 7,761,558 B1 * | 7/2010 | Jindal et al. | ................... | 709/224 |
| 7,904,520 B2 * | 3/2011 | Neal et al. | ...................... | 709/206 |
| 7,962,603 B1 * | 6/2011 | Morimoto | ...................... | 709/224 |
| 8,095,654 B2 * | 1/2012 | Morimoto | ...................... | 709/224 |
| 8,291,073 B2 * | 10/2012 | Campbell et al. | ............. | 709/224 |
| 2001/0047394 A1 * | 11/2001 | Kloba et al. | ................... | 709/217 |
| 2002/0023158 A1 * | 2/2002 | Polizzi et al. | ................. | 709/227 |
| 2002/0078191 A1 * | 6/2002 | Lorenz | .......................... | 709/223 |

(Continued)

*Primary Examiner* — Rupal Dharia
*Assistant Examiner* — Marcus McKenzie
(74) *Attorney, Agent, or Firm* — Fish & Richardson P.C.

(57) ABSTRACT

IP address-user number estimates may be determined by accepting IP address usage information associating various IP addresses with various client identifiers, and generating an estimate of a number of users for at least one of the IP addresses using the IP address usage information. If the client identifiers include cookies, the estimate of a number of users for at least one of the IP address can be generated by determining a number of cookies for the at least one IP address for a given period of time, and multiplying the number by a second, predetermined, ratio of a number of users per cookie for the given time period. Other user identifying information includes user-agent parameters, browser parameters, and uncookied network traffic. The estimate of a number of users per IP address can be generated by determining a ratio of unique sets of user agent, browser parameters, and/or uncookied network traffic.

20 Claims, 6 Drawing Sheets

(56) References Cited

U.S. PATENT DOCUMENTS

| | | | |
|---|---|---|---|
| 2002/0143878 A1* | 10/2002 | Birnbaum et al. | 709/205 |
| 2002/0147570 A1* | 10/2002 | Kraft et al. | 702/186 |
| 2002/0178169 A1* | 11/2002 | Nair et al. | 707/100 |
| 2003/0079017 A1* | 4/2003 | Agrawal et al. | 709/226 |
| 2004/0015727 A1* | 1/2004 | Lahti et al. | 713/201 |
| 2004/0073644 A1* | 4/2004 | Koch et al. | 709/223 |
| 2004/0153365 A1* | 8/2004 | Schneider et al. | 705/14 |
| 2004/0199623 A1* | 10/2004 | Houri | 709/223 |
| 2004/0243704 A1* | 12/2004 | Botelho et al. | 709/224 |
| 2005/0027587 A1* | 2/2005 | Latona et al. | 705/10 |
| 2005/0028188 A1* | 2/2005 | Latona et al. | 725/13 |
| 2005/0160183 A1* | 7/2005 | Valli et al. | 709/245 |
| 2005/0223093 A1* | 10/2005 | Hanson et al. | 709/224 |
| 2006/0004594 A1* | 1/2006 | Doliov | 705/1 |
| 2006/0235827 A1* | 10/2006 | Walsh | 707/2 |
| 2006/0265507 A1* | 11/2006 | Banga et al. | 709/228 |
| 2008/0086559 A1* | 4/2008 | Davis et al. | 709/224 |
| 2008/0147857 A1* | 6/2008 | Oliver et al. | 709/224 |
| 2008/0243822 A1* | 10/2008 | Campbell et al. | 707/5 |
| 2008/0243824 A1* | 10/2008 | Riise et al. | 707/5 |
| 2008/0244046 A1* | 10/2008 | Campbell et al. | 709/222 |
| 2008/0320119 A1* | 12/2008 | Achan et al. | 709/222 |
| 2009/0012965 A1* | 1/2009 | Franken | 707/10 |
| 2009/0037602 A1* | 2/2009 | Patel et al. | 709/245 |
| 2009/0070454 A1* | 3/2009 | McKinnon et al. | 709/224 |
| 2009/0313116 A1* | 12/2009 | Ashbaugh | 705/14.47 |
| 2011/0202608 A1* | 8/2011 | Nassar et al. | 709/206 |
| 2011/0246568 A1* | 10/2011 | Morimoto | 709/203 |
| 2012/0144016 A1* | 6/2012 | Zhang et al. | 709/224 |

* cited by examiner

DETERMINING A NUMBER OF USERS BEHIND A SET OF ONE OR MORE INTERNET PROTOCOL (IP) ADDRESSES

§1. CLAIM OF PRIORITY

This application claims priority to and is a continuation of U.S. patent application Ser. No. 11/479,154, filed Jun. 30, 2006, which is incorporated by reference herein in its entirety.

§2. BACKGROUND OF THE INVENTION

§2.1 Field of the Invention

The present invention concerns determining the number of unique users behind a single Internet protocol (IP) address (or a given set of IP addresses) for a specific period of time. In particular, the present invention concerns determining the number of unique users behind a single IP address (or a given set of IP addresses) using various techniques and building an IP address-user number database for storing and retrieving such data.

§2.2 Related Art

In general, it is impossible to track the exact number of users behind an IP address. The following explains some of the common scenarios to be considered when attempting to track the number of users behind an IP address and the reasons that it is so challenging.

As a first example, several Web page impressions to one IP address might not have been caused by the same person. This is because some people share computers. In a family of five, some family members may visit the same Websites regularly, all using the same computer and Web browser. However, because that particular computer doesn't use a unique IP address for every family member, there is no way to distinguish whether these visits were made by one person or more. Sometimes the computer in question could be at a Cyber-Cafe or in a public library, where dozens of people might use a particular computer on a given day.

A single user might also have multiple computers; each with its own IP address, or using a shared IP address, depending on the network configuration. This makes it hard to establish, conclusively, whether requests from multiple IP addresses are from a single user or multiple users.

An additional complication is that of shared IP addresses. Because the Internet is growing so rapidly, the finite number of available IP addresses is a bit problematic. This has led to dynamic IP addresses allocation (e.g., shared IP addresses that can be provisioned as needed by an Internet Service Provider ("ISP")) as described in more detail below. Many Internet users do not have a particular IP address assigned to their computer. Usually, when they log on to the Internet, the computer that they are using is assigned an IP address from a pool of available IP addresses by their ISP. When they log off, the assigned IP address becomes available and may then used by someone else. This means that an ISP, which only has a pool of a certain number of IP addresses, can service more subscribers than the number of IP addresses in its pool.

Firewalls raise additional considerations when trying to estimate the number of users behind a given IP address. Often corporations, and even smaller businesses, individuals and families, will want to limit access to and from the Internet. Firewalls are useful (a) when trying to make the home or office network more secure, or (b) when there are a limited number of IP addresses at the home or the office. When a firewall is used, all of the computers behind the firewall are separated from the Internet by one computer (usually called a proxy server). All communications into or out of the network pass through the proxy server. If users behind a firewall access Web pages, they will all show up under the same IP address (i.e., the proxy server's IP address). Different machines behind a firewall can sometimes be distinguished by examining operating systems (OS) and browser information, monitor setting information, etc. For example, if there are two different Operating Systems showing up under the same IP address at about the same time, there are probably at least two different machines behind a firewall.

A Web cache is a store of the HTML pages, CSS files, images, etc., for Web pages that a user has visited. Subsequent visits to the same Webpage (within a certain time) will result in files being read from the Web cache rather than being downloaded again from the remote Web server. This makes the Web pages quicker to load and reduces the consumption of network and/or server resources since the Web browser will not request Web pages from a Web server every time a user revisits the Website. Consequently these accesses often won't appear in the server logs or statistics. Caching can occur at the Web browser or at the ISP level—users can control caching at a Web browser level (by changing the cache settings) but usually not at the ISP level. In addition, some ISPs (e.g. America Online (AOL), for example) use multiple proxy servers. When people using AOL as an ISP make a request for a Webpage, the requests for the HTML, CSS, images, etc. can come from any of the proxy servers. Unfortunately, proxy servers prevent a website from directly learning about the numbers of different users accessing the website due to both (1) obscuring or masking the source of the request, and (2) web caching.

The number of users behind an IP address may be tracked using cookies. However this is not always feasible. For example, a user might have "disabled" cookies on their browser.

Despite all of the challenges in obtaining a reliable estimate of the number of unique users behind an IP address, it is nonetheless important to make such estimates. For example, such estimates are useful for determining whether or not visits to a Web page from one or more IP addresses are from a single user, or from multiple users. As another example, such estimates are useful for determining whether or not on-line advertisement selections from one or more IP addresses are from a single user or from multiple users. As yet another example, such estimates are useful for determining whether or not server resources from one or more IP addresses are from a single user or from multiple users. The number of unique users might be a useful indicator of (a) how widespread the popularity of a Website, an advertisement, etc., is, (b) "stickiness" of a Website, (c) click fraud on an advertisement, etc.

In view of the foregoing, it would be useful to improve IP address-user number estimates.

§3. SUMMARY OF THE INVENTION

In at least some embodiments consistent with the present invention, IP address-user number estimates may be determined by accepting IP address usage information associating various IP addresses with various client identifiers, and generating an estimate of a number of users for at least one of the IP addresses using the IP address usage information.

In at least some embodiments consistent with the present invention, the client identifiers include cookies. If so, the estimate of a number of users for at least one of the IP address might be generated, in part, by determining a number of cookies for the at least one IP address for a given period of time, and multiplying the first ratio by a second, predetermined, ratio of a number of users per cookie for the given time period.

In at least some embodiments consistent with the present invention, the client identifiers are user-agent parameters and/or browser parameters (e.g., screen setting information, time zone, history length, whether or not Java enabled, number of plug-ins, mime types, etc.). If so, the estimate of a number of users per IP address might be generated, in part, by determining a ratio of unique sets of user agent and/or browser parameters for an IP address.

§4. BRIEF DESCRIPTION OF THE DRAWINGS

§5. DETAILED DESCRIPTION

The present invention may involve novel methods, apparatus, message formats, and/or data structures for determining an estimated number of unique users behind a single IP address. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

In the following, terms that are used in this application are defined in §4.1. Then, environments in which, or with which, embodiments consist with the present invention may operate are described in §4.2. Then, exemplary embodiments consistent with the present invention are described in §4.3. Finally, some conclusions regarding the present invention are set forth in §4.4.

§5.1 Definitions

A "client identifier" is information that might be used to uniquely identify, or to help to uniquely identify, a client device (e.g., a computer on a network) and/or a user.

A "cookie" is (e.g., textual) information sent by a server to a client device application (e.g., a Web browser on a computer), and then sent back to the server when the application later accesses the server. For example, an "HTTP cookie" is a parcel of textual information sent by a server to a Web browser and then sent back by the browser each time it accesses the server. HTTP cookies may be used for user authentication, user tracking, and maintaining user-specific information such as Website preferences, electronic shopping carts, etc.

Figure 1:
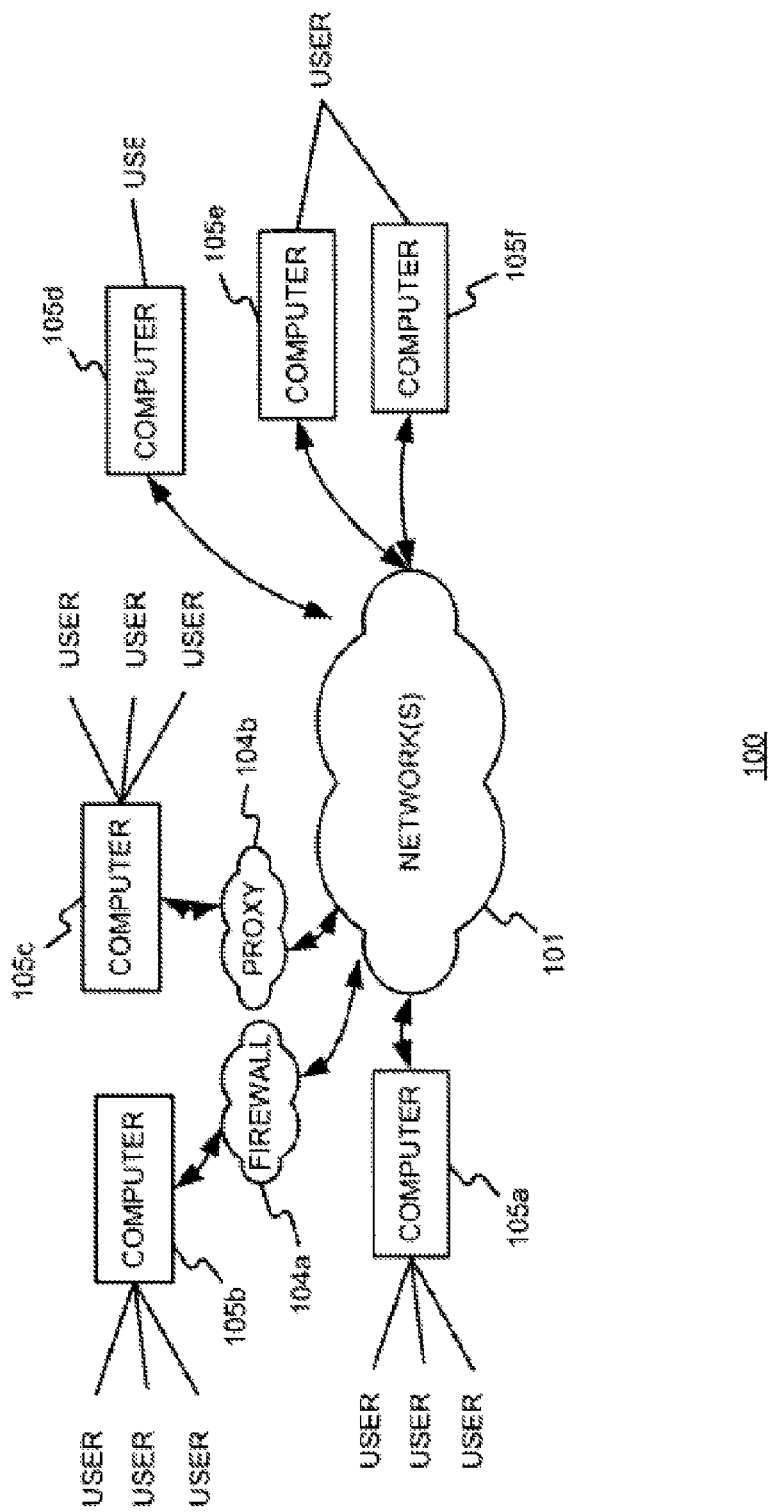
FIG. 1 is a diagram illustrating an environment in which, or with which, embodiments consistent with the present invention may operate.

§5.2 Exemplary Environments in which, or with which, Embodiments Consistent with the Present Invention May Operate FIG. 1 is a diagram illustrating an exemplary environment 100 in which, or with which, embodiments consistent with the present invention may operate. Specifically, the environment 100 may include one or more network(s) (e.g., the Internet) 101 over which parties or entities such as users and computers 105a-105f, can communicate.

The environment 100 illustrates various ways that users can interact with (e.g., servers on) the network(s), such as those that were addressed in the background section above. In particular, some possible interactions include, for instance, (a) multiple users sharing the same computer 105a, (b) multiple users sharing the same computer 105b through a firewall 104a (or multiple/single users operating on different computers behind a firewall 104a (not shown)), (c) multiple users using the same computer 105c to access the network(s) 101 through a proxy server 104b (or multiple/single users operating on different computers behind a proxy server 104b (not shown)), (d) a single user using a single computer 105d to access the network(s) 101, and (e) a single user using multiple computers 105e and 105f to access the network(s) 101. As the foregoing different examples (and other possible configurations) illustrate, it is challenging to track the exact number of users behind an IP address.

§5.3 Exemplary Embodiments

Figure 2:
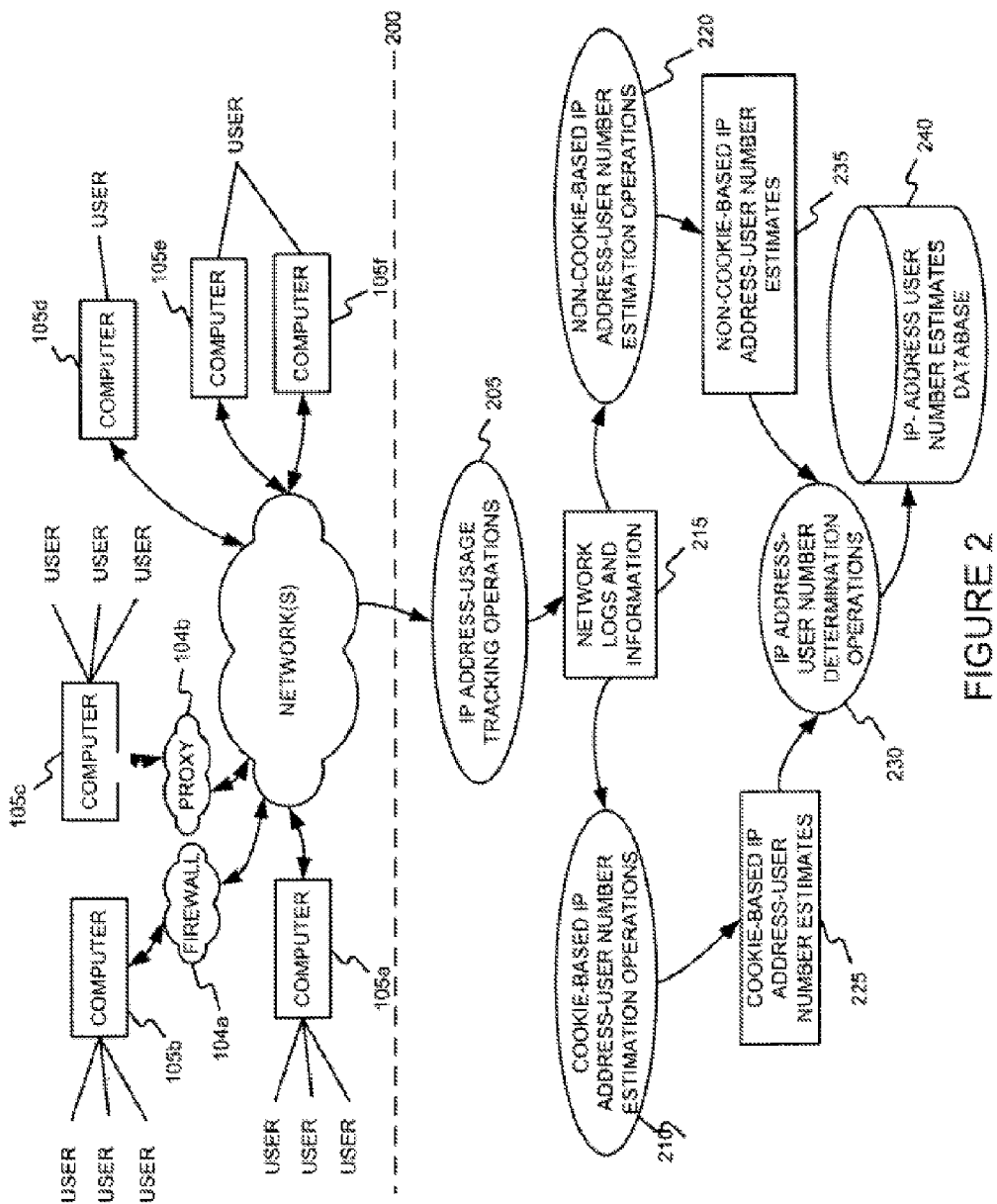
FIG. 2 is a bubble diagram of exemplary operations that may be performed in a manner consistent with the present invention, as well as information that may be used and/or generated by such operations.

FIG. 2 is a bubble diagram of exemplary operations that may be performed in a manner consistent with the present invention, as well as information that may be used and/or generated by such operations, shown below dashed line 200, in the context of an environment such as that 100 of FIG. 1. Specifically, the system may include IP address-usage tracking operations 205, cookie-based IP address-user number estimation operations 210, non-cookie-based IP address-user number estimation operations 220, and IP address-user number determination operations 230.

The IP address-usage tracking operations 205 may be used to generate network usage logs and information 215. The network logs and information 215 may be made available to the cookie-based IP address-user number estimation operations 210, as well as the non-cookie-based IP address-user number estimation operations 220. Using such network logs and information 215, the cookie-based IP address-user number estimation operations 210 may determine cookie-based IP address-user number estimates 225. Also using network logs and information 215, the non-cookie-based IP address-user number estimation operations 220 may determine non-cookie-based IP address-user number estimates 235. The IP address-user number determination operations 230 may accept both cookie-based IP address-user number estimates 225, as well as non-cookie-based IP address-user number estimates 235, and use one or both of such estimates to determine a final IP address-user number estimate. The final IP address-user estimates may be stored in an IP address-user number estimates database 240.

The IP-usage tracking operations 205 are responsible for collecting miscellaneous network information such as cookies from users, IP addresses, usage logs, browser parameters, etc. Information 215 might include an index including entries, each entry mapping an IP address to one or more unique cookies (e.g., corresponding to applications or browsers that have accessed the Internet via the IP address), and perhaps a count number of unique cookies. Alternatively, or in addition, information 215 may include an index including entries, each entry mapping an IP address to one or more unique user agent and browser parameter sets (e.g., corresponding to client devices that have accessed the Internet via the IP address). Thus, there may be mapping of each of one or more IP addresses to one or more client identifiers.

The cookie-based IP address-user number estimation operations 210 are responsible for determining an IP address-user number estimate. Specifically, operations 210 may use the network log information 215 in order to determine IP address-cookie associations. Next, using the determined IP-cookie associations, as well as predetermined cookie-user ratios (e.g., a number of cookies per user over different time periods determined through experimentation and studies), the cookie-based IP address-user number estimation operations 210 may be able to generate cookie-based IP address-user number estimates 225.

The non-cookie-based IP address-user number estimation operations 220 are also responsible for determining an IP address-user number estimate. Specifically, it may use and analyze network log information 205 in order to determine user agent and browser parameter set to IP address associations. Using such sets of user agent and browser parameters, the non-cookie-based IP address-user number estimation operations 220 may generate non-cookie-based IP address-user number estimates 235.

The IP address-user number determination operations 230 are responsible for determining a final IP address-user number estimate. Specifically, it 230 may reconcile the cookie-based IP address-user number estimates 225 and non-cookie-based IP address-user number estimates 235 according to a set of rules/assumptions/heuristics to produce a final IP address-user number estimate. The final IP address-user number estimates are saved at a database 240 for further use.

§5.3.1 Exemplary Methods

Figure 3:
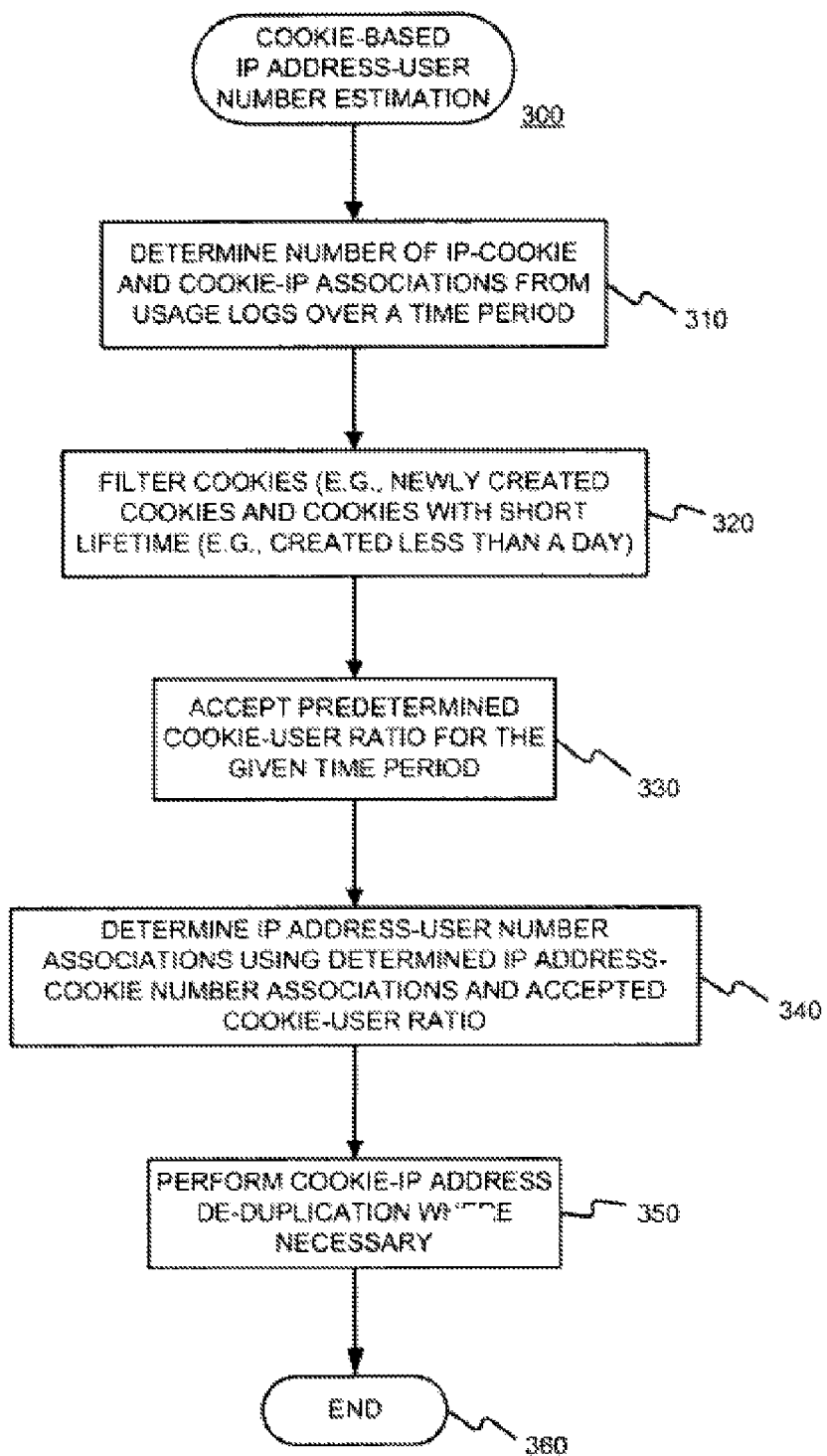
FIG. 3 is a flow diagram of an exemplary method for determining cookie-based IP address-user number estimates in a manner consistent with the present invention.

FIG. 3 is a flow diagram of an exemplary method 300 for determining cookie-based IP address-user estimates in a manner consistent with the present invention. In particular the method 300 may determine a number of IP-cookie and cookie-IP associations from usage logs over a time period. (Block 310) Subsequently, the method 300 may filter out cookies (e.g., newly created cookies and cookies with short lifetime (e.g., less than a day old)). (Block 320) Further, the method 300 may accept predetermined cookie-user ratios for the given time period. (Block 330) The method 300 may then determine IP address-user number associations using determined IP address-cookie number associations and accepted cookie-user ratios. (Block 340) Finally, the method 300 may perform cookie-IP address de-duplication where necessary. (Block 350).

Referring back to block 310, the method 300 may start with network usage logs (e.g., Google log sources) to analyze IP addresses and associated cookies (e.g., Google PREF cookies) over a period of time. (As a result this would provide the IP address-cookie associations for google.com traffic).

The method 300 could track a single user appearing across a number of IP addresses. It 300 could also estimate the number of users behind a single IP address by looking at the number of cookies associated with an IP address. The following IP address and cookie permutations may be considered:

(1) a single cookie and IP address only—this is most likely a single user behind the IP address (unless it is a shared computer);

(2) a cookie appears multiple times with a mix of IP addresses—it may be a single user whose ISP assigns a new dynamic IP address each time the user connects to the Internet, or a user who moves between locations. If these IP addresses fall under a reasonably long (e.g., 16 bits or more) prefix, a Dynamic Host Configuration Protocol ("DHCP") address pool may have been identified; and (3) a single IP address with multiple cookies—if the number of cookies are small (e.g., less than five) over a period of time, it could be an indication that a single user appears through different browsers or computers; it could also be an indication that a single user clears or resets cookies. If the number of cookies is large, this is most likely a proxy server's IP address. The number of users behind the proxy could be estimated on a daily basis, a weekly basis, a monthly basis, etc.

The method 300 may also perform traffic analysis on IP address-cookie associations, to find out the percentage of traffic represented by IP address segments with various cookie number and cookie age combinations. This would provide an indication of the volume of cookied traffic and allow the method 300 to focus cookie analysis on high-volume traffic IP address segments.

Referring back to block 320, the method 300 might filter out newly created cookies and cookies with short lifetime (e.g., less than one day old). These are most likely from browsers that do not accept cookies, or only accept session cookies. A lot of spam IP addresses fall into this category too. It may also be the case that users clear cookies in less than one day, or the requests come from first time users. In the later case, the cookie might be counted when it re-appears after more than one day.

Referring back to blocks 330 and 340, the method 300 may accept predetermined cookie-user ratios for a given time period. These cookie-user ratios may be determined experimentally. For example, to determine cookie-user ratios for a given time period, a property or a domain where each user is uniquely identifiable (e.g., using a user login and/or password at the domain) independently of the cookie may be analyzed. In this way, given the number of unique users visiting the domain, as well as the number of unique cookies observed by the domain, the number of cookies an average user uses over a period of time can be determined. Different cookie-user ratios might be determined for different domains and/or for different types of domains. The ratio is expected to increase as the time period increases. Naturally, the ratios might be determined in other ways, or obtained from third parties.

The cookie-user ratio is probably higher for email users than for search users, since it is not uncommon for users to log in from different locations to check emails, and also since users might not check emails as frequently as they perform searches.

Referring back to block 350, the method 300 may perform cookie-IP de-duplication where necessary. Specifically, a user may have different IP addresses at different times (due to dynamic IP address assignment or the user moving between different locations) with a single cookie associated with multiple IP addresses. The method 300 should perform some de-duplication for these scenarios.

To illustrate an exemplary de-duplication process, consider the following example. Assume network log information having cookie-IP pairs $\{cookie_i, IP_i\}$ has been gathered. The method 300 might generate an IP address-number of cookies pair log $\{IP_i \rightarrow \#cookies\}$ as well as a cookie-number of IP address pair log $\{cookie_i \rightarrow \#IPs\}$. For cookies associated with more than one IP address, the method 300 may initiate the de-duplication process. For instance, assume that $cookie_A$ has five IP addresses. As a result the method 300 may generate a "revised" log as follows:

$$\{\left(\frac{1}{5}\right) cookie_A, IP_1\}$$

$$\{\left(\frac{1}{5}\right) cookie_A, IP_2\}$$

$$\{\left(\frac{1}{5}\right) cookie_A, IP_3\}$$

$$\{\left(\frac{1}{5}\right) cookie_A, IP_4\}$$

$$\{\left(\frac{1}{5}\right) cookie_A, IP_5\}$$

$$\vdots$$

As is evident, the five IP addresses that were associated with $cookie_A$ are now only associated with one fifth of $cookie_A$ in the revised log. The revised log may then be regenerated to form a final IP address-number of cookies log wherein the number of cookies in the revised regenerated log may be the sum of whole and fractional cookies.

Figure 4:
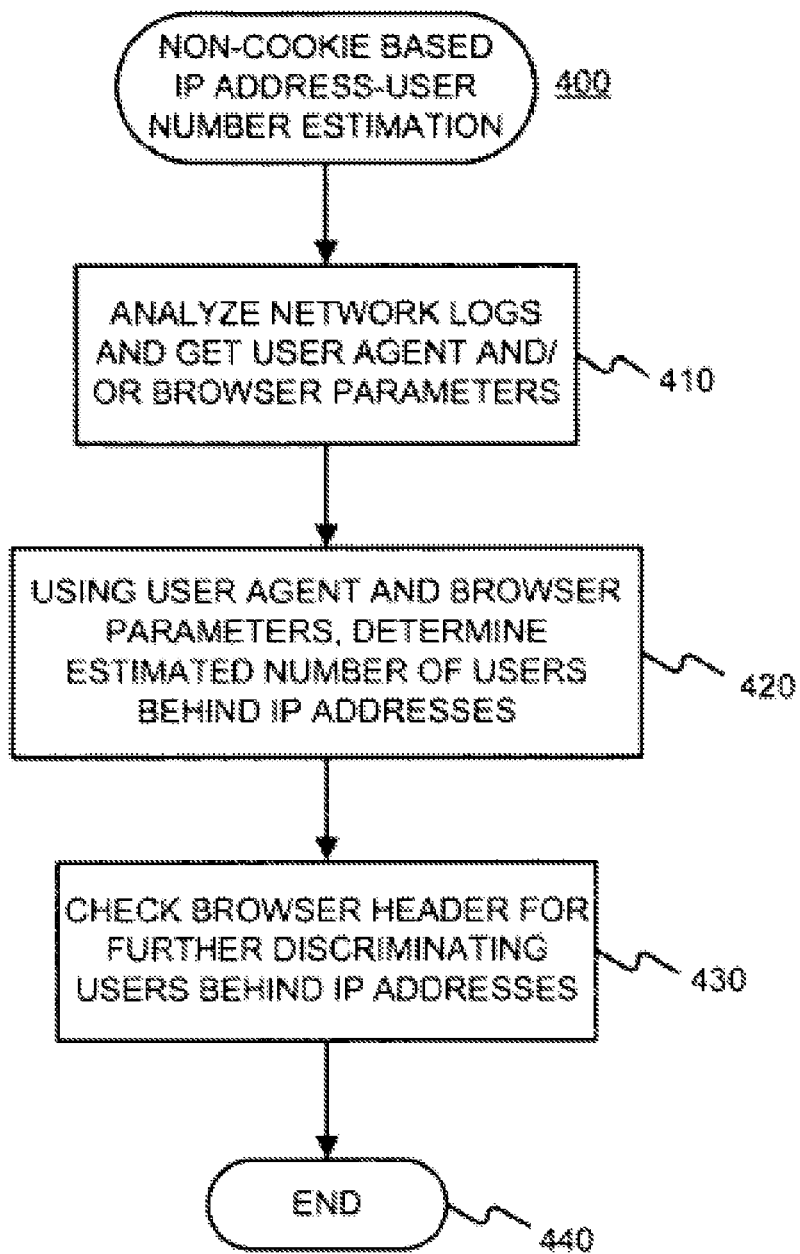
FIG. 4 is a flow diagram of an exemplary method for determining non-cookie-based IP address-user number estimates in a manner consistent with the present invention.

FIG. 4 is a flow diagram of an exemplary method 400 for determining non-cookie-based IP address-user number estimates in a manner consistent with the present invention. In particular, the method 400 may analyze network logs and get user agent and browser parameters. (Block 410) Next, using user agent and/or browser parameters, the method 400 may determine an estimated number of users behind IP addresses. (Block 420) Subsequently, the method 400 might check the browser header as an aid to further discriminate users behind IP addresses. (Block 430)

Referring back to blocks 410 and 420, the method 400 may analyze traffic from Web sites that do not cookie users. For example, when ad impressions are shown on Websites participating in the Google AdSense advertising network, "show ads" java script gathers values for the following parameters from the user browser:
screen height/width, available height/width, color depth;
time zone;
history length;
java enabled or not;
number of plug-ins; and
mime types.
These parameters might be logged. A browser "user agent" might be obtained from the log source. A "user agent" is the client application used with a particular network protocol; the phrase is most commonly used in reference to those which access the Web. Web user agents range from Web browsers to search engine crawlers ("spiders"), as well as mobile phones, screen readers and braille browsers used by people with disabilities. When Internet users visit a Website, a text string is generally sent to identify the user agent to the server. This forms part of the HTTP request, prefixed with "User-agent:" or, "User-Agent:" and typically includes information such as the application name, version, host operating system, and language. By combining the user agent and the above browser parameters, the method 400 may determine a good indication of how many users are behind a single IP address. Note that the order of browser parameters (e.g., in the browser header of an HTTP request) might also be used to distinguish different users.

Figure 5:
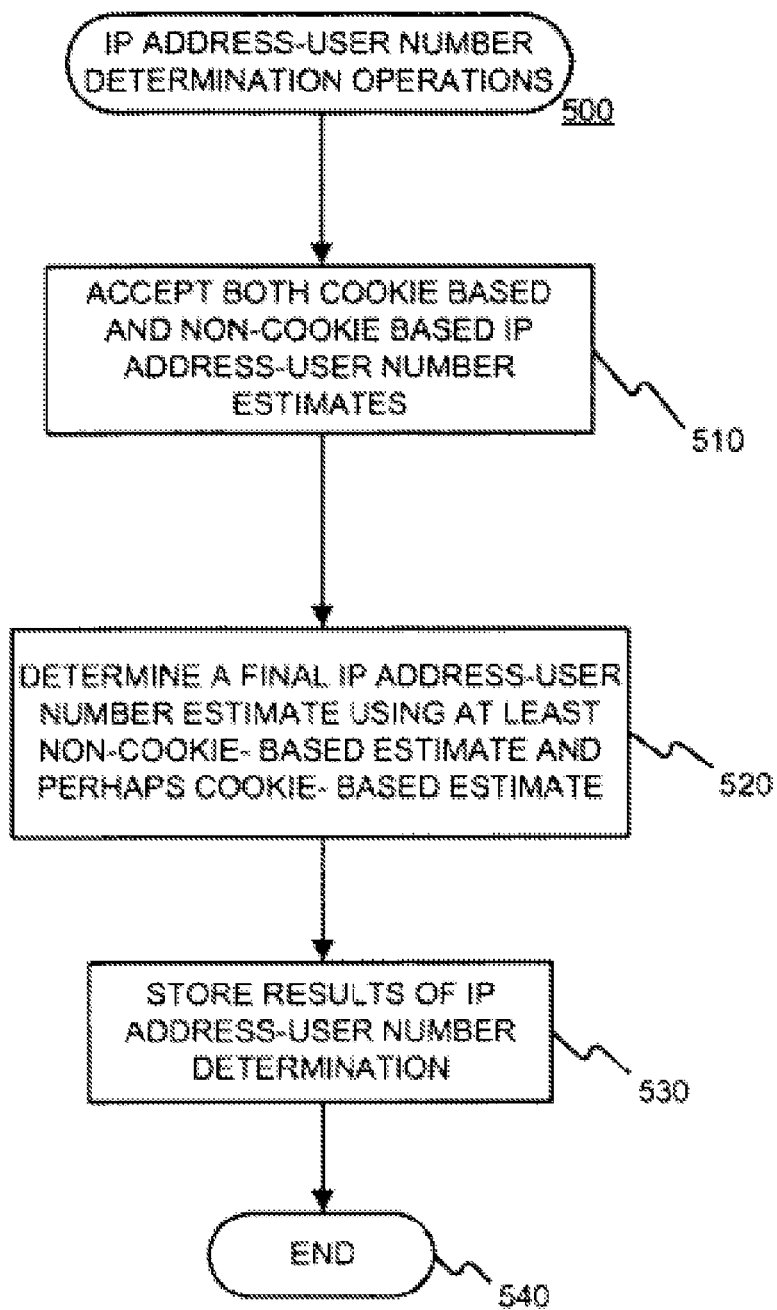
FIG. 5 is a flow diagram of an exemplary method for determining IP address-user number estimates in a manner consistent with the present invention.

FIG. 5 is a flow diagram of an exemplary method for determining IP address-user number estimates in a manner consistent with the present invention. Specifically, the method 500 may accept both cookie-based and non-cookie-based IP address-user number estimates. (Block 510) Using these estimates, the method 500 may then determine a final IP address-user number estimate using the non-cookie-based estimates, and perhaps the cookie-based estimates. (Block 520) Further, the resulting IP address-user number estimate (Block 530) may be stored in the IP address-user number estimates database.

Referring back to block 520, once the method 500 obtains the IP address-user estimates, (e.g., on google.com traffic, based on cookie analysis, and IP address-user estimation on partner sites based on user agent and browser parameters), it may need to reconcile estimates for IP addresses that appear in both analysis. The following are a set of rules/assumptions/heuristics that might be employed in order to determine a final estimated number of IP-user number associations. First, if an IP address has a single cookie associated with it over a period of time, but has several combinations of user-agent and browser parameters, it might be assumed that it has multiple users behind it. The variation of user-agent and browser parameters is a good indication that the same cookie is copied over intentionally or accidentally. Thus, the non-cookie-based estimate might be used as the final estimate in such instances.

Second, if an IP address has several cookies associated with it over a period of time and is considered to have a single user behind it (based on cookie user ratio), and the same IP address has several combinations of user-agent and browser parameters, it might be assumed that there are multiple users behind it. Thus, the non-cookie-based estimate might be used as the final estimate in such instances.

Third, if an IP address has several cookies associated with it, but with the same user-agent and browser parameters over a period of time, it might be assumed that there is a single user behind it (and that the number of cookies are probably introduced by cookie churn). Thus, the non-cookie-based estimate might be used as the final estimate in such instances.

Finally, if an IP address has many cookies associated with it over a period of time and is considered to have n users behind it, and the same IP address has many user-agent and browser parameter combinations and is considered to have m users behind it, to be conservative, it might be assumed that the smaller of the two estimates (MIN$\{m,n\}$) is the number of users behind the IP address. Alternatively, it might be assumed that the average $((m+n)/2)$ is the number of users behind the IP address. Alternatively, some other combination of the two estimates might be used.

§5.3.2 Exemplary Apparatus

Figure 6:
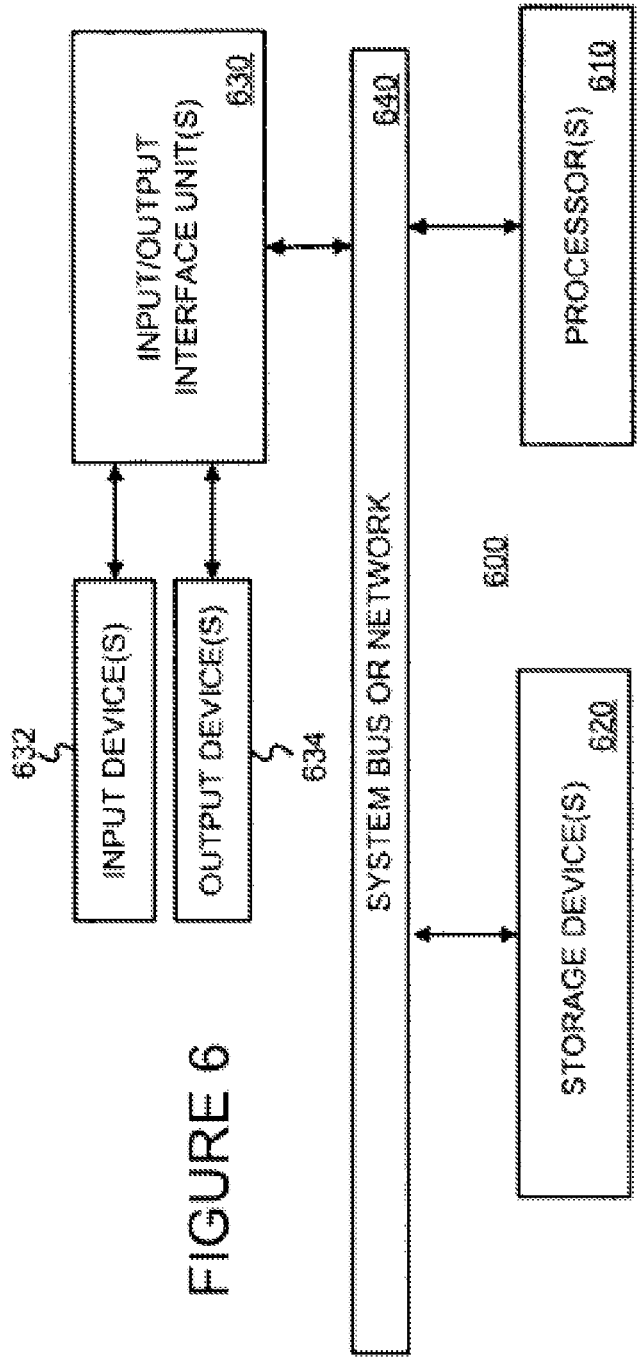
FIG. 6 is a block diagram of an exemplary apparatus that may perform various operations, and store various information generated or used by such operations, in a manner consistent with the present invention.

FIG. 6 is high-level block diagram of a machine 600 that may perform one or more of the operations discussed above. The machine 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 620 and/or may be received from an external source via one or more input interface units 630. Thus, the operations may be performed by the execution by the processor(s) 610 of machine-executable instructions, which may be stored on storage device(s) 620, and/or which may be received via input device(s) 632 and input/output interface unit(s) 630. Information generated and/or used by such operations may be stored on the storage device(s) 620 and/or sent to and/or received from an external device (not shown) via input/output interface unit(s) 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

§5.3.3 Refinements, Alternatives and Extensions

Although some of the exemplary embodiments were described in the context of determining an estimated number of unique users behind a single IP address, they may be used to determine an estimated number of unique users behind (a) a prototypical IP address (e.g., average number of users behind an "average" IP address), (b) an IP address of a certain type, (c) a set of two or more IP addresses, etc.

In an attempt to prevent spam proxies and bad addresses from entering into the system, some embodiments consistent with the present invention might employ a list of known spam (or bad) proxies and IP addresses. Such embodiments might exclude these IP addresses from the IP address user estimation and tag them with user count set to 0. Thus, for example, these IP addresses might not be credited when calculating campaign metrics such as reach and frequency.

With the IP address-user number estimate, embodiments consistent with the present invention may be able to compile a list of suspicious IP addresses. For instance, if an IP address was found to have a single user behind it, but an unusually large number of impressions or conversions, this could indicate a spam IP address.

To improve the accuracy of cookie user ratios, some embodiments consistent with the present invention might analyze the cookie-user relationship to IP addresses. For instance, in an overall cookie-user ratio, the cookie-user ratio may vary depending on IP addresses. It would be useful to obtain IP addresses, user ids and cookies from a cookie user study, and measure the cookie-user ratio across different IP segments.

Some embodiments consistent with the present invention might get traffic-based user-estimates based on IP addresses with a large number of users behind them (e.g., proxies, ISPs, etc.)—using metrics such as search clicks, on-line advertisement clicks, and search queries to estimate queries-to-user, and/or clicks-to-user ratios on trackable users (e.g., cookied users) and extend those estimates to uncookied traffic.

Some embodiments consistent with the present invention might analyze the probability that an older cookie becomes a new cookie based on its access patterns. Cookies that disappear from the system might be analyzed based on their likelihood of mortality. An old cookie might be associated with (e.g. treated as being the same as) a new cookie that appears on the same IP address (e.g., if cookie-churn is assumed to exist).

With the cookie-based approach, some embodiments consistent with the present invention might assume that a predetermined percentage (e.g., 6%) of internet users turn off their cookies.

Since cookie churn makes it hard to distinguish returning users from new users, some embodiments consistent with the present invention might estimate cookie churn by applying some cookie-to-user ratio.

Some cookies might not be unique. Furthermore, some cookies may be forged or stolen. Some embodiments consistent with the present invention might use (only) cookies that have collision and/or copy resistant user identifiers.

§5.4 Conclusions

As can be appreciated from the foregoing, embodiments consistent with the present invention may provide better IP address-user number estimates. These estimates are useful, for example, for determining whether or not visits to a Web page from one or more IP addresses are from a single user, or from multiple users; whether or not on-line advertisement selections from one or more IP addresses are from a single user or from multiple users; whether or not server resources from one or more IP addresses are from a signal user or from multiple users; estimating a number of users accessing a Web page or Website; estimating a number of users that viewed certain ad impression; estimating a per user visit frequency; etc.

What is claimed is:

1. A storage device having instructions stored thereon, the instructions, when executed by one or more processors, cause the processors to perform operations comprising:
   a) accepting IP address usage information associating various IP addresses with various client identifiers; and
   b) generating an estimate of a number of users for at least one of the IP addresses using the IP address usage information, wherein the client identifiers include cookies, and wherein the act of generating an estimate of a number of users for at least one of the IP addresses comprises:
  i) determining a number of cookies for the at least one IP address for a given period of time producing a first ratio, and
  ii) multiplying the first ratio by a second, predetermined, ratio of a number of users per cookie for the given time period.

2. The storage device of claim 1 wherein the predetermined ratio of a number of users per cookie for the given time period is an empirically determined value.

3. The storage device of claim 1 wherein the act of determining a number of cookies for the at least one IP address for a given period of time includes filtering out cookies with a life shorter than a predetermined period of time.

4. The storage device of claim 1 wherein the act of determining a number of cookies for the at least one IP address for a given period of time includes performing cookie-IP address de-duplication.

5. The storage device of claim 1 wherein the client identifiers are at least one of (A) user-agent parameters and (B) browser parameters, and wherein the act of generating an estimate of a number of users per IP address includes determining a ratio of unique sets of user agent and/or browser parameters for an IP address.

6. The storage device of claim 5 wherein the browser parameters include at least two of (i) screen setting information, (ii) time zone, (iii) history length, (iv) whether or not Java enabled, (v) number of plug-ins, and (vi) mime types.

7. The storage device of claim 5 wherein the screen setting information includes at least one of (a) screen height, (b) screen width, (c) available height, (d) available width, and (e) color depth.

8. The storage device of claim 1 wherein the client identifiers are at least one of (A) user-agent parameters having an order and (B) browser parameters having an order, and wherein the act of generating an estimate of a number of users per IP address includes determining a ratio of unique sets of user agent and/or browser parameters in a unique order for an IP address.

9. A storage device having instructions stored thereon, the instructions, when executed by one or more processors, cause the processors to perform operations comprising:
  a) accepting IP address usage information associating various IP addresses with various client identifiers; and
  b) generating an estimate of a number of users for at least one of the IP addresses using the IP address usage information,
  wherein the client identifiers include both (1) cookies and (2) user agent parameters and/or browser parameters, and wherein the act of generating an estimate of a number of users for at least one IP addresses comprises:
    i) determining a first ratio of a number of cookies for the at least one IP address for a given period of time,
    ii) multiplying the first ratio by a second, predetermined, ratio of a number of users per cookie for the given time period to generate a cookie-based estimate,
    iii) determining a ratio of unique sets of user agent and/or browser parameters for the at least one IP address to generate a non-cookie-based estimate, and
    iv) determining a final estimate of a number of users per IP address using (1) the cookie-based estimate, (2) the non-cookie-based estimate, and (3) heuristics.

10. The storage device of claim 9 wherein the heuristics include:
  a if an IP address has a single cookie associated with it over the given period of time, but has several unique sets of user-agent and/or browser parameters, using the non-cookie-based estimate as the final estimate.

11. The storage device of claim 9 wherein the heuristics include:
  if an IP address has several cookies associated with it over the given period of time and is considered to have a single user behind it, and the same IP address has several sets of unique user-agent and/or browser parameters, then using the non-cookie-based estimate as the final estimate.

12. The storage device of claim 9 wherein the heuristics include:
  if an IP address has several cookies associated with it, but with the same set of user-agent and/or browser parameters over the given period of time, then using the non-cookie-based estimate as the final estimate.

13. The storage device of claim 9 wherein the heuristics include:
  if an IP address has many cookies associated with it over a period of time and is considered to have n users behind it, and the same IP address has many unique sets of user-agent and/or browser parameter and is considered to have m users, setting the final estimate to the smaller of n and m.

14. The storage device of claim 9 wherein the heuristics include:
  if an IP address has many cookies associated with it over a period of time and is considered to have n users behind it, and the same IP address has many unique sets of user-agent and browser parameter and is considered to have m users, setting the final estimate to some function of m and n.

15. The storage device of claim 9 wherein the heuristics include:
  if an IP address has many cookies associated with it over a period of time and is considered to have n users behind it, and the same IP address has many unique sets of user-agent and browser parameter and is considered to have m users, setting the final estimate to (m+n)/2.

16. A computer-implemented method, comprising:
  a) accepting IP address usage information associating various IP addresses with various uncookied network traffic; and
  b) generating an estimate of a number of users for at least one of the IP addresses using the IP address usage information,
  wherein the uncookied network traffic includes user selection of search results or other content, and wherein the act of generating an estimate of a number of users for at least one of the IP addresses comprises:
    i) determining a first ratio of an amount of uncookied network traffic, over a giver period of time, per the at least one IP address, and
    ii) multiplying the first ratio by a second, predetermined, ratio of a number of users per the amount of uncookied network traffic for the given time period.

17. The method of claim 16 wherein the predetermined ratio of a number of users per the amount of uncookied network traffic for the given time period is an empirically determined value.

18. The method of claim 16, wherein the predetermined ratio of a number of users per the amount of uncookied network traffic for the given time period is determined based on an amount of cookied network traffic, over a giver period of time, per the at least one IP address, the cookied network traffic including selection of search results or advertisements by cookied users.

19. The method of claim 16, wherein the IP address usage information further associates the various IP addresses with various cookies, and wherein the act of generating an estimate of a number of users for at least one IP addresses further comprises:
   i) determining a third ratio of a number of cookies for the at least one IP address for a given period of time,
   ii) multiplying the third ratio by a fourth, predetermined, ratio of a number of users per cookie for the given time period to generate a cookie-based estimate,
   iii) determining a non-cookie-based estimate for the number of users for the at least one of the IP addresses using a product of the first ratio and the second ratio, and
   iv) determining a final estimate of a number of users per IP address using (1) the cookie-based estimate, (2) the non-cookie-based estimate, and (3) heuristics.

20. The method of claim 19, further comprising:
   identifying the at least one of the IP addresses as a spam IP address based on a difference between the cookie-based estimate and the non-cookie-based estimate.

* * * * *